United States Patent [19]

De'Ath et al.

[11] Patent Number: 5,551,141
[45] Date of Patent: Sep. 3, 1996

[54] METHOD OF INJECTION MOULDING A POLYMERIC MATERIAL INSERT INTO A METAL SHELL

[75] Inventors: Roderick M. De'Ath, Wantage; Donald E. Griffiths, Paignton, both of United Kingdom

[73] Assignee: Carnaudmetalbox PLC, United Kingdom

[21] Appl. No.: 303,197

[22] Filed: Sep. 8, 1994

[30] Foreign Application Priority Data

Sep. 12, 1993 [GB] United Kingdom ............ 9318937

[51] Int. Cl.⁶ .................................................. B29C 45/14
[52] U.S. Cl. ........................ 29/527.3; 264/267; 264/268
[58] Field of Search ............................ 29/527.1, 527.3; 264/259, 266, 267, 268, 269

[56] References Cited

U.S. PATENT DOCUMENTS

| | | |
|---|---|---|
| 2,131,319 | 9/1938 | Greenholtz . |
| 2,700,186 | 1/1955 | Stover ........................... 264/268 |
| 3,004,297 | 10/1961 | Stover ......................... 264/268 X |
| 3,307,221 | 3/1967 | Bolner ......................... 264/266 X |
| 4,312,824 | 1/1982 | Mori et al. ................... 264/268 X |
| 4,496,513 | 1/1985 | Ishikawa et al. ............... 264/267 |
| 4,549,337 | 10/1985 | Newell et al. ............... 264/268 X |

FOREIGN PATENT DOCUMENTS

| | | |
|---|---|---|
| 1578138 | 6/1968 | France . |
| 1915147 | 3/1969 | Germany . |
| 47-14039 | 11/1968 | Japan ........................... 264/268 |
| WO8401352 | 4/1984 | WIPO . |

*Primary Examiner*—S. Thomas Hughes
*Attorney, Agent, or Firm*—Diller, Ramik & Wight, P.C.

[57] ABSTRACT

A method of forming a component having a metallic shell (12) and a plastics insert (34). The component is formed by placing the shell (12) inside the mould cavity of a mould assembly (10) which forms part of an injection moulding machine. Prior to injection of plastics material, part of the external surface of the shell (12) is spaced from the opposed surface of the mould cavity. The open end of the shell abuts the adjacent mould cavity and wall so as to form a seal. This end wall is frusto-conical in shape so that, during injection of plastics material, as the shell (12) is reformed by polymer pressure into complete engagement with the surface of the mould cavity, longitudinal contraction of the shell in response to this direct lateral strain is compensated for by the frusto-conical shape so that the seal is maintained.

23 Claims, 4 Drawing Sheets

METHOD OF INJECTION MOULDING A POLYMERIC MATERIAL INSERT INTO A METAL SHELL

BACKGROUND OF THE INVENTION

This invention relates to a method of making a component of the type comprising a metallic shell closed at one end and an insert of a polymeric material located within the shell.

In many types of component such as a closure member for a container, the component comprises simply a metallic shell or a metallic shell formed with a relatively thin lining of a suitable material by a coating process, such as a metal/polymer laminate. For most purposes, such components are satisfactory. However, for some types of components particularly closure members for high quality containers such as perfume bottles, the closure member takes the form of a metallic shell and an insert of substantial thickness which is formed from a polymeric material and is located within the shell. Conventionally, the metallic shell and the insert are formed separately, adhesive is then applied to the shell and/or the insert and the insert is then placed in position in the shell. However, this method of making a closure member suffers from the disadvantage that it requires several manufacturing stages and is correspondingly expensive.

Whilst it is therefore desirable to form the insert by moulding it in situ within the shell, in a conventional moulding process it is difficult to maintain consistent sealing integrity of the shell within the mould, so as to prevent leakage of polymeric material during moulding beyond the end of the shell. It is also difficult to achieve satisfactory location of the insert in the shell after the polymeric material has cooled and undergone shrinkage. It may be desired to form relief features on the shell for decorative or other purposes, but to form such features as a separate operation on the shell prior to inserting it into the mould cavity would involve additional manipulative and manufacturing stages and may require angular orientation of the shell in relation to the mould cavity. It has been found that over a wide range of thicknesses of the shell material the polymer pressures which are conventionally used in injection-moulding may be employed to reform the shell outwardly into one or more recesses which are suitably provided in the mould cavity wall. Thus at the same time as the insert is being moulded the shell may be formed with one or more relief features (i.e. protuberances) which may serve both for decorative purposes and for mechanically locking the insert against substantial movement within the shell to prevent or reduce relative movement.

SUMMARY OF THE INVENTION

According to the present invention, there is provided a method of manufacturing a component by injection moulding an insert of polymeric material into a metal shell closed at one end, the shell being located within a mould cavity and the open end of the shell engaging a frustoconical portion of the mould cavity wall to form a seal therebetween whereby, when polymer is admitted at high pressure to the interior of the shell to form the insert therein, longitudinal contraction of the shell is compensated for by the frustoconical portion of the mould, thereby maintaining the integrity of the seal.

The longitudinal contraction of the shell in response to direct lateral strain developed across the shell (in accordance with Poisson's ratio) in prior art mould cavities would result in a gap between the end of the shell and the adjacent cavity end wall. This would break the seal and allow polymer to escape to the exterior of the shell. The provision of a frustoconical portion, however, compensates for this contraction since as the shell contracts and is simultaneously forced outwards by the polymer, it moves down the slope of the frustoconicol portion.

According to a further aspect of the present invention, there is provided a method of manufacturing a component by injection moulding an insert of polymeric material into a metal shell closed at one end, the shell being located within a mould cavity and the open end of the shell engaging the mould cavity end wall to form a seal therebetween and the shell being compressed longitudinally whereby, when polymer is admitted at high pressure into the interior of the shell to form the insert therein, longitudinal contraction of the shell releases the compression without the shell disengaging the cavity end wall and breaking the seal.

The cavity end wall which the open end of the metal shell abuts may be frustoconical to provide further compensation for contraction of the shell.

Preferably the mould cavity wall is locally relieved at one or more recesses and the shell is located in the mould cavity with the recesses in spaced opposition to its outside surface so that when polymer is admitted at high pressure to the interior of the shell to form the insert therein, the pressure of the polymer causes the shell to be expanded into substantial conformity with the said recesses to form one or more relief features thereon. By thus forcing the shell to expand into the recess or recesses of the mould cavity wall, there is achieved the advantage that the shell can be formed into a complex shape at the same time that the insert is formed. Moreover, because the shell and insert are formed to the same shape together, the external surface of the insert will be complementary to the internal surface of the shell.

According to a second aspect of this invention, there is provided a component comprising a metallic shell closed at one end and having an inwardly turned free end, and an insert of polymeric material located inside the shell and engaging the free end in which the insert has been formed in situ within the shell by injection-moulding and its external surface substantially conforms to the internal surface of the shell, at least at one or more relief features which are formed in the shell.

This invention will now be described in more detail, by way of example, with reference to the drawings which show embodiments of the invention. In the drawings:

DESCRIPTION OF THE PREFERRED EMBODIMENTS

Figure 1:
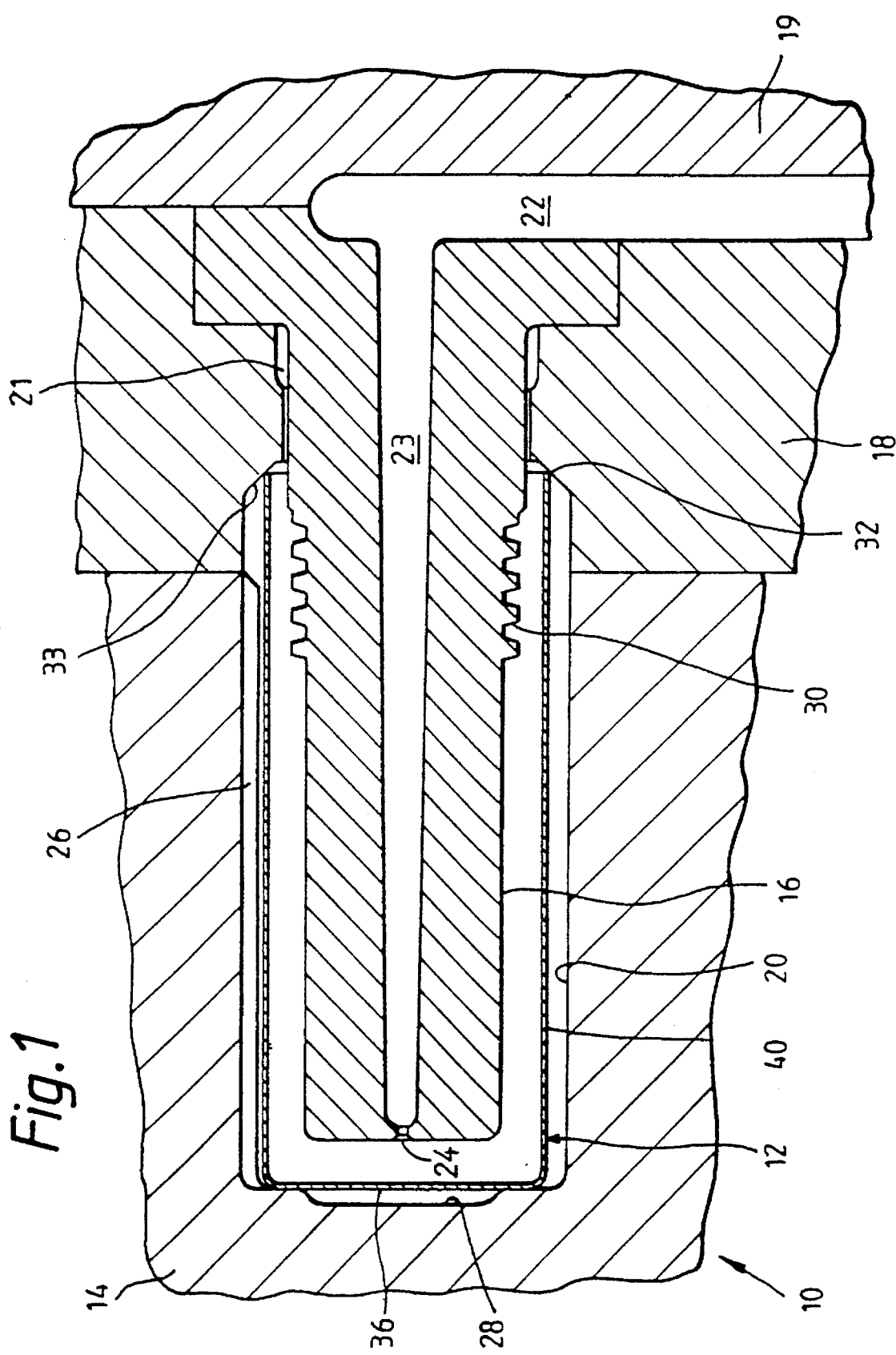
FIG. 1 is a cross-sectional view of a part of a mould assembly with a metallic shell located therein prior to forming an insert.

Referring now to FIG. 1, there is shown a mould assembly 10 for making individual components such as closure members in succession. The mould assembly forms part of an otherwise conventional moulding machine of the type which forms products by injection moulding of plastics material.

As is well known, in such a moulding machine there is provided a chamber (not shown) in which plastics material is plasticized. In FIG. 1, the mould assembly is shown at a stage where it contains a shell 12 formed from a metallic material such as steel or aluminium and which is destined to form part of a closure member. The shell has a cylindrical side wall 40 closed by an integral base 36 at one end.

The mould assembly 10 comprises a mould member 14 which defines a cavity, a core member 16, a core plate 18 and a runner plate 19. The mould member 14, the core member 16 and the core plate 18 together form the wall of the mould cavity the defining surface of which is indicated by the reference numeral 20.

The core member 16 is held captive by the core plate 18. A small gap 21 between the core member and the core plate acts as a vent which permits gas to escape from the mould cavity during the moulding process. The core plate and the runner plate 19 define the first part 22 of a runner or feed channel for supplying plasticized material from the plasticising chamber to the mould cavity. A second part 23 of the feed channel passes axially through the core member and terminates with a gate 24.

In order to make a closure member with the mould assembly 10, the mould member 14 is moved away from the remainder of the mould assembly and a metallic shell 12 is then placed in the mould cavity. The mould member 14 is then moved back into engagement with the core plate 18. At this stage, the shell 12 and the core member 16 are in the position shown in FIG. 1.

Surface 20 includes a frustoconical end portion 33. The shell 12 engages this end portion so that a seal is formed between the shell and the wall, thus preventing escape of the plastics material during moulding along the outside of the side wall 40.

As shown in FIG. 1, prior to the injection of the plastics material, part of the external surface of the shell 12 is locally spaced from the surface 20 of the mould cavity at a plurality of recesses with which the surface 20 is formed. In the finished closure member, the configuration of the external surface of shell 12 is defined by the configuration of the surface 20. In the present example, the surface 20 has a number of axially extending parallel grooves 26 adjacent the side wall 40 of the shell, and a recessed circular portion 28 adjacent its base 36. Many other configurations are possible for the surface of mould cavity. For example, in place of the circumferentially spaced, axially extending grooves 26, the surface of the mould cavity may be provided with a set of circumferentially extending, axially spaced, grooves, suitable provision then being made for enabling the mould member 14 to be expanded so as to allow ejection of the finished closure member. The recesses of the surface 20 (e.g. the grooves 26) may have a complex shape if desired.

The external surface of the core member 16 defines the configuration of the internal surface of the insert in the finished closure member. Many different configurations are possible for the external surface of the core member. In the example shown in FIG. 1, the external surface includes a screw thread 30.

As a result of moving the mould member 14 into engagement with the core plate 18, the open end 32 of the shell 12 is forced into engagement with the frustoconical end portion 33 of the surface 20 of the mould cavity.

Figure 2:
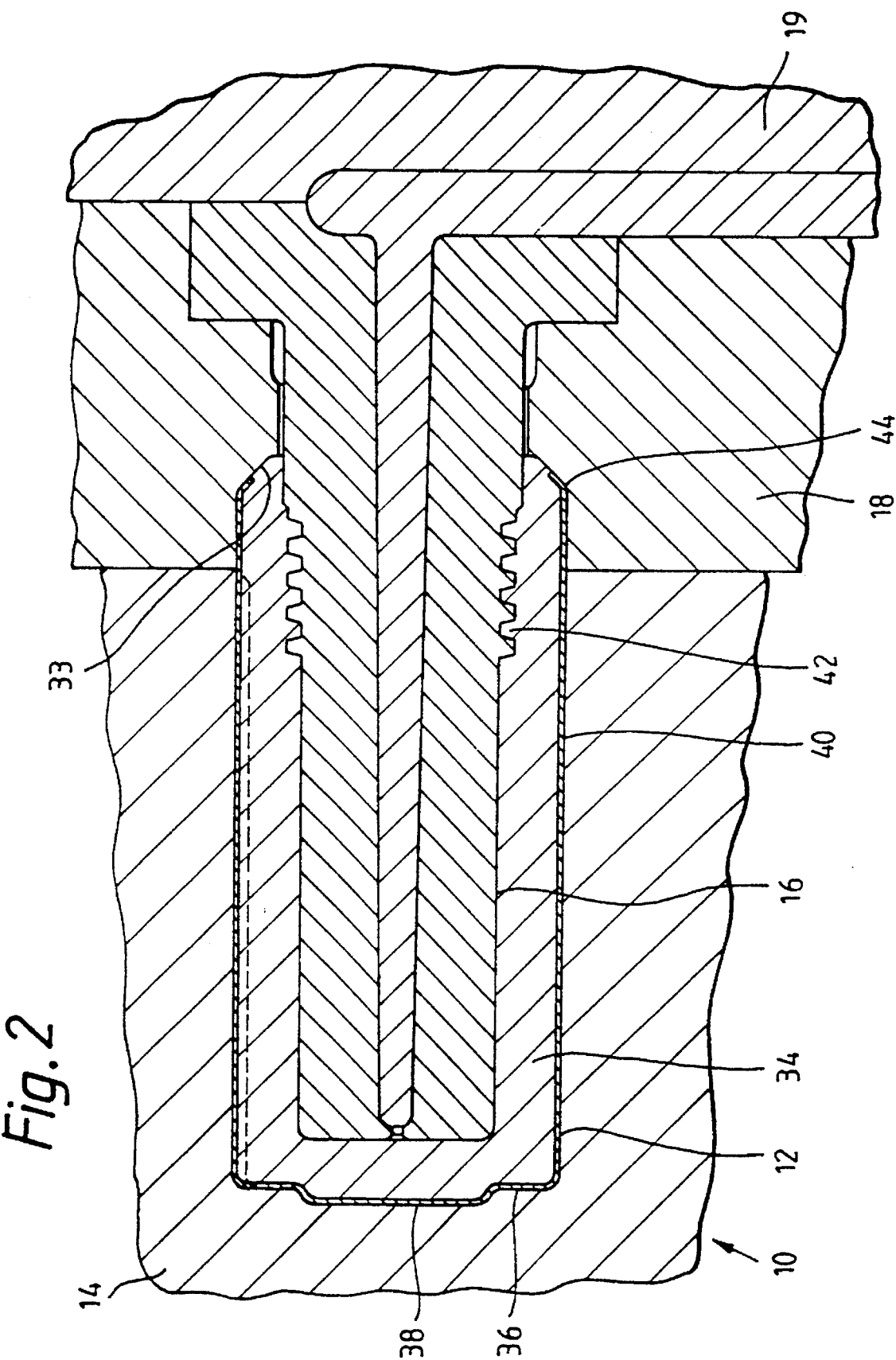
FIG. 2 is a cross-sectional view of the mould assembly of FIG. 1 after an insert has been formed in the shell.

FIG. 2 shows the mould assembly 10 immediately after platics material has been injected at high pressure into the mould cavity. As the high pressure material stresses the shell laterally, a strain develops which is accompanied by a longitudinal contraction of the shell, compensating for the increase in width. This longitudinal contraction is in turn compensated for by the frustoconical end portion 33 which ensures that the open end of the shell maintains contact with the surface 20 at the same time as the shell is pushed outwards by the pressure of the injected material. In addition to, or instead of, the provision of frustoconical portion 33, the shell 12 may be compressed longitudinally prior to injection of polymer. The compression is partly or wholly released by contraction during moulding, without compromising the seal.

During this injection operation the shell 12 is reformed by the polymer pressure so as to make almost complete engagement with the surface 20, including the contribution of the grooves 26. Because the insert 34 is formed as a result of an injection process, its external surface adopts the configuration of the internal surface of the shell 12. The internal surface of the insert is defined by the external surface of the core member 16. Following its injection into the mould cavity the plastics material cools and solidifies, the mould member 14 is displaced from the core plate 18, and the completed closure member is ejected. In this embodiment ejection will require unscrewing of the closure member from the screw threads 30.

In the completed closure member, as shown in FIG. 2, the base 36 of the shell 12 has a central circular protrusion 38, and the skirt 40 of the shell has a number of longitudinally extending ribs corresponding to the grooves 26 of the mould cavity. The insert 34 conforms closely to the shell where they are in contact; it accordingly has ribs corresponding to, and located within, those of the shell and has a screw thread 42 adjacent the open end of the closure member. The shell has an inturned lip 44 at its open end, and this lip, together with any adhesive bonding which may occur between the insert and the shell and mechanical locking at the ribs formed by the grooves 26, retains the insert in position against substantial movement within the shell. The closure member shown in FIG. 2 is suitable as a cap for a perfume or scent bottle.

The method of making a closure member with reference to FIGS. 1 and 2 provides several advantages over a conventional method in which the shell 12 and insert 34 are formed separately. The provision of a sealing surface in frustoconical form prevents any polymer from leaking outside the shell and spoiling the end component. Because the insert 34 is formed in situ, the formation of the insert and its insertion into the shell occur in a single operation. Also, because the protrusion 38 and the ribs of the shell are formed during the injection process, no separate operation is needed to form them.

The frustoconical sealing surface provides a surface against which the shell 12 bears as the injected material pushes the shell outwards. As a result, the shell forms the inturned lip 44 which becomes embedded in the injected material. There is thus no exposed sharp edge to the metallic shell which could give rise to personal injury.

Moreover, the insert is made closely to conform to the shell and is mechanically interlocked with the shell to prevent or discourage substantial relative movement between them.

In a non-illustrated modification of the shell 12 of the moulding process of FIGS. 1 and 2, the shell is turned inwardly at its open end so as to conform to the shape of the frustoconical portion 33. As the plastics material is injected and the shell contracts, this inward turn moves down the sealing surface 33.

A further embodiment which appears the same as that of FIGS. 1 and 2, includes means for compressing in shell 12 longitudinally, for example by shortening mould member 14. This compressive force is released as the plastics material is injected into the mould. Compressive forces may be used to maintain the seal between the open end of the shell and the core plate either on their own or in conjunction with the frustoconical sealing surface 33.

In another non-illustrated modification of the moulding process depicted in FIGS. 1 and 2, the mould is so arranged that the moulded insert extends outwardly beyond the free edge of the shell which accordingly is buried in the polymer material of the insert, but without material being able to flow around the outside of the shell. In the locality of the free edge on the outside of the shell, intimate contact of the insert with the shell is enhanced by the shrinkage which occurs in the insert polymer on cooling. The possibility of substantial movement of the insert in relation to the shell is accordingly further reduced.

Figure 3:
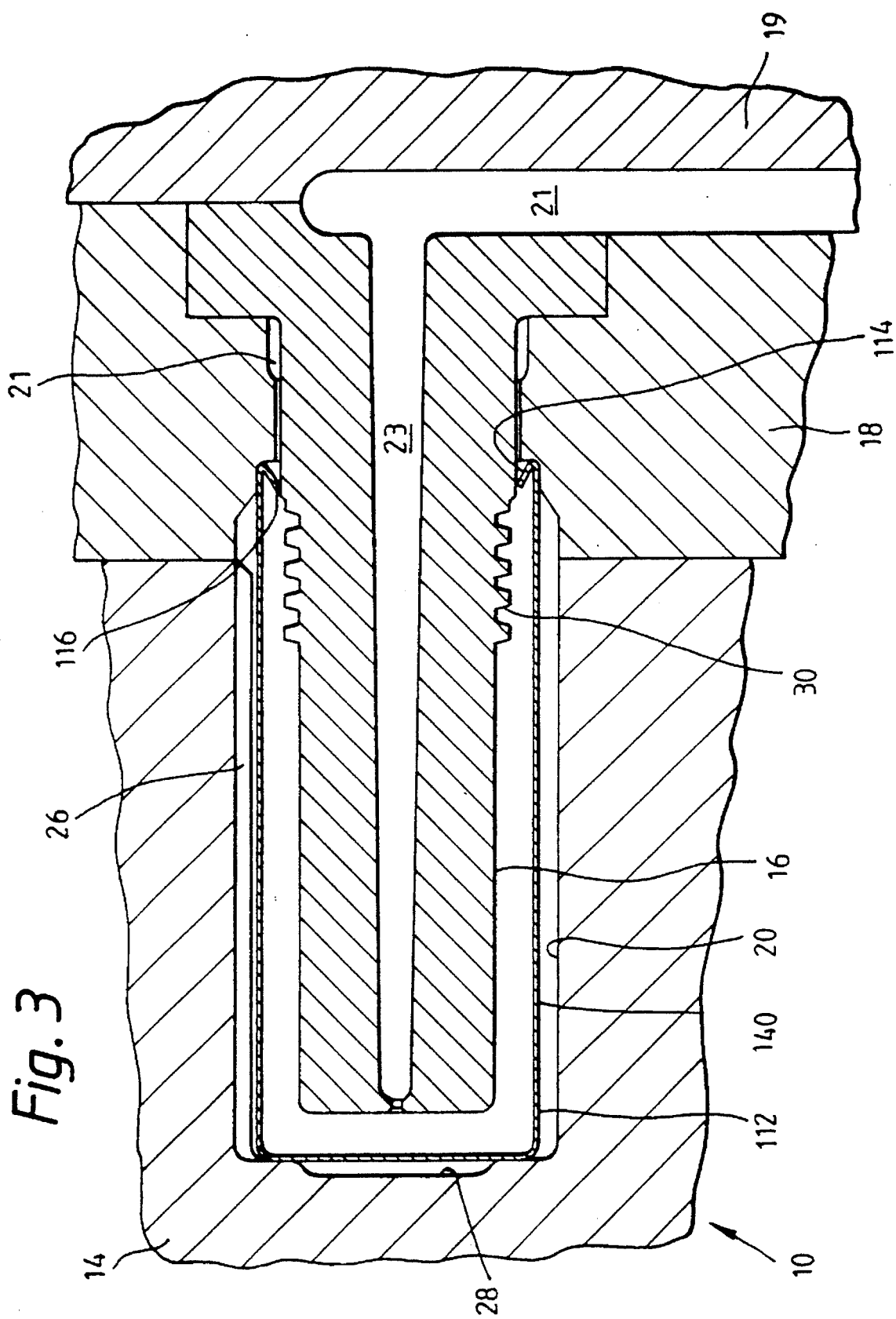
FIG. 3 is a cross-sectional view of the mould assembly of FIG. 1 with a modified metallic shell located therein prior to forming an insert.
Figure 4:
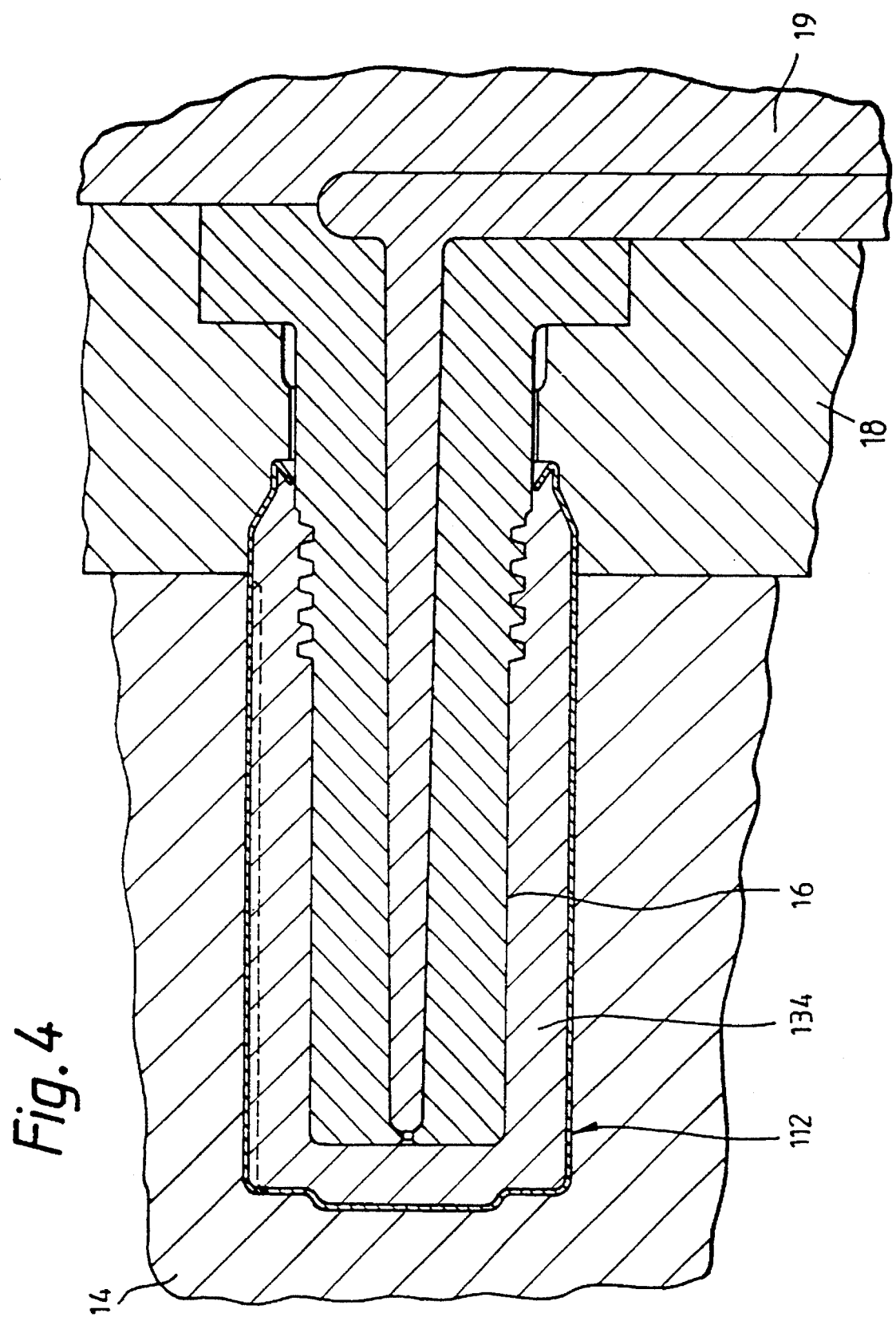
FIG. 4 is a cross-sectional view of the mould assembly of FIG. 1 after an insert has been formed in the modified shell.

Referring now to FIGS. 3 and 4, there is shown the mould assembly 10 when adapted for making a different closure member from those made by the process of FIGS. 1 and 2 and the non-illustrated process of the last paragraph. FIG. 3 shows the arrangement of the mould assembly after the insertion of a shell 112 but before injection of the plastics material. FIG. 4 shows the arrangement of the mould assembly immediately after the plastics material has been injected to form an insert 134.

The shell 112 is identical to the shell 12 with one modification. An end portion 114 including the free edge 116 of the shell 112 is turned inwardly to lie at an acute angle with respect to the remainder of its side wall 140. The free edge resiliently engages the external surface of core member 16. As a result of this engagement, plastics material is prevented from escaping during injection. However, the engagement is not capable of preventing the venting of gas from the mould cavity.

As shown in FIG. 4, at the open end of the closure member, the shell 112 is turned-in and overlies the end of the insert 134. In the closure member shown in FIG. 2, the end of the insert 34 protrudes beyond the end of the shell 12 and thus detracts from the overall high quality all-metal image of the closure member. In contrast, in the closure member of FIG. 4, the end of the insert 134 does not protrude beyond the end of the shell 112 and so the high quality image is not damaged. The inwardly turned free edge thus also protects the user of the component who might otherwise risk being cut by the sharp metal. Moreover, shrinkage of the polymer on cooling will tend to create good contact engagement of the polymer with the inturned end portion 114, so enhancing location of the insert in the shell.

Although the present invention has been described in these examples with reference to forming a closure member, it is suitable for forming a wide variety of components. Also, whilst as particularly described the pressure of polymer during the moulding process may advantageously be used to form the relief features in the metal shell, such an arrangement is not essential; in possible modifications of the described embodiments the relief features are formed in the shell by a separate operation prior to its insertion into the mould. It is essential only that polymer is prevented by the seal from reaching the exterior of the metal shell.

The present invention is suitable for forming inserts from a wide variety of thermoplastic or thermosetting polymeric materials (including elastomers). If desired, the shell may have an internal coating of a polymeric material to promote adhesion with the insert over at least a part of the shell; for example, the shell may be formed of a metal-polymer laminate such as is currently being promoted by Applicants under the trade names METPOLAM, FERROLITE and ALULITE.

Although a preferred embodiment of the invention has been specifically illustrated and described herein, it is to be understood that minor variations may be made in the apparatus without departing from the spirit and scope of the invention, as defined the appended claims.

We claim:

1. A method of manufacturing a component defined by a metal shell and an injection moulded polymeric material insert comprising the steps of:
   (a) providing a metal shell having an open end and an end opposite thereto closed by an end panel,
   (b) providing a mould assembly define by a mould cavity wall, said mould cavity wall having a frusto-conical portion,
   (c) locating the metal shell in the mould assembly with the metal shell open end engaging the frusto-conical portion of the mould cavity wall to form a seal therewith, and
   (d) injecting polymeric material at high pressure into the interior of the shell to form an insert therein during which longitudinal contraction of the shell under the effect of the high pressure is compensated for by the metal shell open end sliding along the frusto-conical portion to maintain seal integrity.

2. The component manufacturing method as defined in claim 1 in which the shell open end is turned inwardly.

3. The component manufacturing method as defined in claim 1 including the steps of providing the mould cavity with at least one recess, and locating the metal shell with the at least one recess in spaced opposition to an outside surface of the metal shell whereby the pressure of the polymeric material causes the metal shell to be expanded into substantial conformity with the at least one recess to form at least one relief feature thereon.

4. The component manufacturing method as defined in claim 1 including the step of positioning core member in internal telescopic relationship to the metal shell prior to the performance of step (d), and the metal shell open end further includes a terminal edge engaging an exterior surface of the core member whereby seal integrity is thereby additionally maintained.

5. The component manufacturing method as defined in claim 1 including the step of positioning a core member in internal telescopic relationship to the metal shell prior to the performance of step (d), and the metal shell open end further includes a peripheral end portion turned inwardly to define a radius portion and a terminal edge respectively engaging the frusto-conical portion and an exterior surface of the core member to maintain seal integrity.

6. The component manufacturing method as defined in claim 1 wherein the frusto-conical portion increases radially outwardly in size in a direction toward a closed end of the mould cavity, and the metal shell is located in the mould cavity with the metal shell end panel contiguous the mould cavity closed end.

7. The component manufacturing method as defined in claim 6 in which the shell open end is turned inwardly.

8. The component manufacturing method as defined in claim 6 including the steps of providing the mould cavity with at least one recess, and locating the metal shell with the at least one recess in spaced opposition to an outside surface of the metal shell whereby the pressure of the polymeric material causes the metal shell to be expanded into substantial conformity with the at least one recess to form at least one relief feature thereon.

9. The component manufacturing method as defined in claim 6 including the step of positioning a core member in internal telescopic relationship to the metal shell prior to the performance of step (d), and the metal shell open end further includes a terminal edge engaging an exterior surface of the core member whereby seal integrity is thereby additionally maintained.

10. The component manufacturing method as defined in claim 6 including the step of positioning a core member in internal telescopic relationship to the metal shell prior to the performance of step (d), and the metal shell open end further includes a peripheral end portion turned inwardly to define a radius portion and a terminal edge respectively engaging the frusto-conical portion and an exterior surface of the core member to maintain seal integrity.

11. A method of manufacturing a component defined by a metal shell and an injection moulded polymeric material insert comprising the steps of:
   (a) providing a metal shell having an open end and an end opposite thereto closed by an end panel,
   (b) providing a mould assembly defining a mould cavity wall having a seal forming portion,
   (c) locating the metal shell in the mould assembly with the metal shell open end engaging the seal forming portion of the mould cavity wall to form a seal therewith,
   (d) longitudinally compressively loading the metal shell to place the metal shell open end into compressive bearing engagement with the seal forming portion, and
   (e) injecting polymeric material at high pressure into the interior of the shell to form an insert therein during which longitudinal contraction of the shell under the effect of the high pressure is compensated for by the progressive release of the metal shell compressive loading to maintaining seal integrity.

12. The component manufacturing method as defined in claim 11 wherein the seal forming portion is a frusto-conical portion.

13. The component manufacturing method as defined in claim 11 in which the shell open end is turned inwardly.

14. The component manufacturing method as defined in claim 11 including the steps of providing the mould cavity with at least one recess, and locating the metal shell with the at least one recess in spaced opposition to an outside surface of the metal shell whereby the pressure of the polymeric material causes the metal shell to be expanded into substantial conformity with the at least one recess to form at least one relief feature thereon.

15. The component manufacturing method as defined in claim 11 including the step of positioning a core member in internal telescopic relationship to the metal shell prior to the performance of step (d), and the metal shell open end further includes a terminal edge engaging an exterior surface of the core member whereby seal integrity is thereby additionally maintained.

16. The component manufacturing method as defined in claim 11 including the step of positioning a core member in internal telescopic relationship to the metal shell prior to the performance of step (d), and the metal shell open end further includes a peripheral end portion turned inwardly to define a radius portion and a terminal edge respectively engaging the frusto-conical portion and an exterior surface of the core member to maintain seal integrity.

17. The component manufacturing method as defined in claim 11 wherein the frusto-conical portion increases radially outwardly in size in a direction toward a closed end of the mould cavity, and the metal shell is located in the mould cavity with the metal shell end panel contiguous the mould cavity closed end.

18. The component manufacturing method as defined in claim 11 wherein the seal forming portion is opposite to and spaced from a closed end of the mould, and the metal shell is located in the mould assembly with the metal shell end panel contiguous the mould cavity closed end.

19. The component manufacturing method as defined in claim 18 in which the shell open end is turned inwardly.

20. The component manufacturing method as defined in claim 18 including the steps of providing the mould cavity with at least one recess, and locating the metal shell with the at least one recess in spaced opposition to an outside surface of the metal shell whereby the pressure of the polymeric material causes the metal shell to be expanded into substantial conformity with the at least one recess to form at least one relief feature thereon.

21. The component manufacturing method as defined in claim 18 including the step of positioning a core member in internal telescopic relationship to the metal shell prior to the performance of step (d), and the metal shell open end further includes a terminal edge engaging an exterior surface of the core member whereby seal integrity is thereby additionally maintained.

22. The component manufacturing method as defined in claim 18 including the step of positioning a core member in internal telescopic relationship to the metal shell prior to the performance of step (d), and the metal shell open end further includes a peripheral end portion turned inwardly to define a radius portion and a terminal edge respectively engaging the frusto-conical portion and an exterior surface of the core member to maintain seal integrity.

23. The component manufacturing method as defined in claim 18 wherein the frusto-conical portion increases radially outwardly in size in a direction toward a closed end of the mould cavity, and the metal shell is located in the mould cavity with the metal shell end panel contiguous the mould cavity closed end.

* * * * *